Dec. 22, 1964 F. JONKER 3,162,468

INTEGRATION OF SUPERIMPOSABLE CARDS

Filed March 14, 1961 2 Sheets-Sheet 1

INVENTOR
Frederick Jonker

BY Homer R. Montague
ATTORNEY

Dec. 22, 1964 F. JONKER 3,162,468

INTEGRATION OF SUPERIMPOSABLE CARDS

Filed March 14, 1961 2 Sheets-Sheet 2

INVENTOR
Frederick Jonker

BY [signature]
ATTORNEY 3,162,468

INTEGRATION OF SUPERIMPOSABLE CARDS

Frederick Jonker, Washington, D.C., assignor to Jonker Business Machines, Inc., a corporation of Delaware Filed Mar. 14, 1961, Ser. No. 95,639
9 Claims. (Cl. 281—43)

This invention pertains to information retrieval systems based on the use of superimposable cards dedicated to terms, and the determination of coincidence of holes disposed in a predetermined matrix array in said cards. These systems are also known as Peekaboo systems. Commercially they are known as Termatrex systems.

In the "Termatrex" systems, an item of information is prepared for entry into the system by first indexing it by a number of terms taken from a vocabulary of terms. Each item of information is given an accession number.

"Termatrex" systems comprise of a number of physical records such as cards each dedicated to a term. In total there will generally be a vocabulary of between 500 and 5000 terms. On each termcard there generally is one place dedicated to a document in the collection. Each document has the same position dedicated to it on each termcard, so that the card constitutes a predetermined matrix unit.

Items of information are entered into a "Termatrex" system by selecting all of the termcards by which that item has been indexed and punching all of these cards at the position dedicated to that item of information. Terms can be words, classes, letters, numerals or any description or properties of any kind. The "vocabulary" of terms usually ranges between 500 and 5000.

A search of made by selecting a number of cards corresponding to the search terms, usually 2 to 4 cards, superimposing the same and scanning these for coinciding holes in the hole patterns of all of the superimposed cards. After that, these cards are placed back in the files.

There are cases in which small systems using cards of a small capacity of, for example, 500 items are punched by hand, without the use of any machinery. There are also cases in which computer controlled card punches punch superimposable termcards of the Hollerith type.

In both cases these cards are of small capacity. A collection of 50,000 items of information using cards of a capacity of 500 items of information per set of cards, would thus require $$\frac{500,000}{500}=100$$

"sets" of these cards. Each "set" will contain a card dedicated to a term of the vocabulary. This means that if a collection of, for example, 50,000 items has to be searched, 100 different superimpositions will have to be made.

The selection of all these termcards, their superimposition and their re-filing is a very laborious process. It is, therefore, the object of this invention to provide for reducing the search time. According to the invention, this is achieved by composing a number of these low capacity records into one large record of larger capacity.

The means by which this can be accomplished will be set forth with the help of the following figures.

Figure 3:
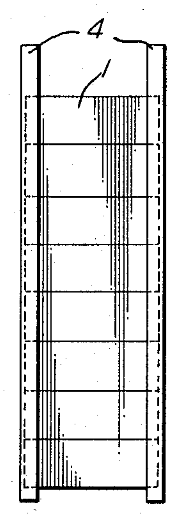

FIGURE 3, a method of integration or linear array of cards by tape.

Figure 4B:
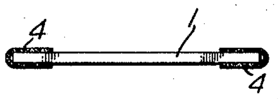
Figure 4A:
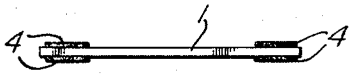

FIGURES 4–A and 4–B are end end views of FIG. 3 showing two different ways of achieving theh taping in that figure.

Figure 5:
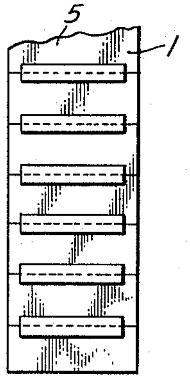
Figure 6:
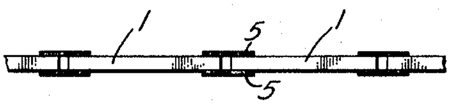

FIGURES 5 and 6 show and alternative way of taping.

Figure 7:
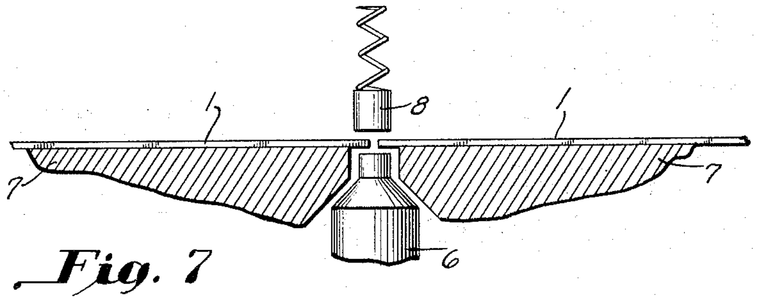

FIGURE 7 shows a method fusing plastic cards together by heat.

Figures 8, 10:
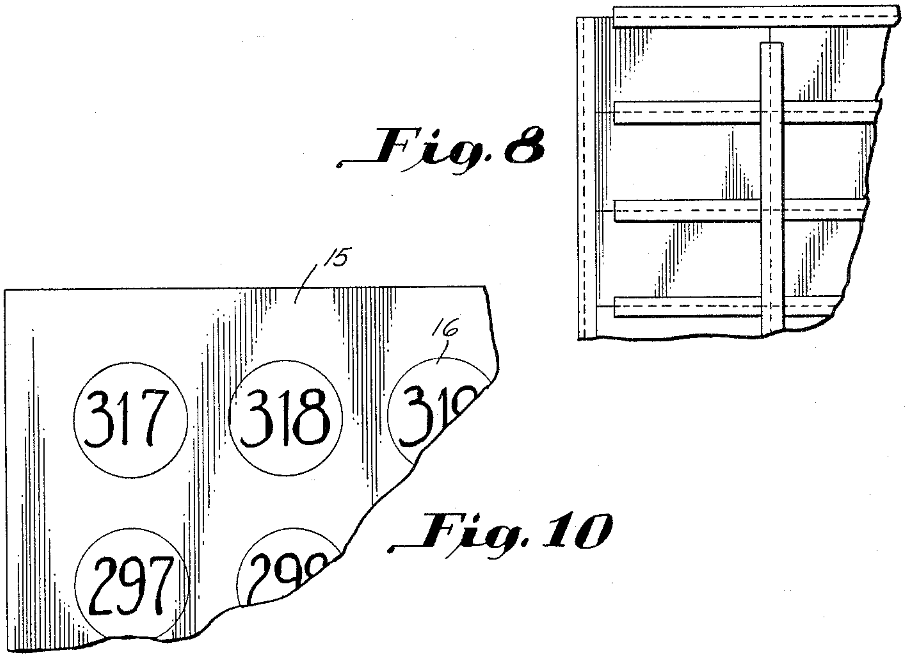

FIGURE 8 shows the taping applied to a two-dimensional array.

Figure 9:
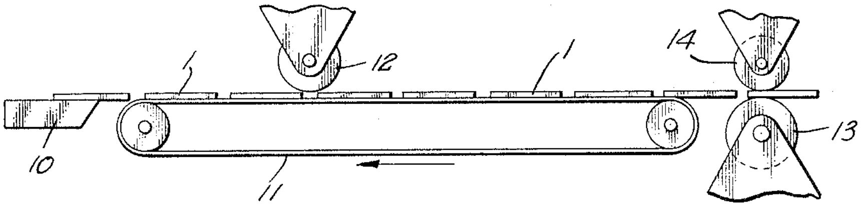

FIGURE 9 shows schematically an apparatus for applying the tape in the way shown in FIGURE 3.

FIGURE 10 shows a method of read-out based on microform numbers to be read by a magnifying glass.

Figure 1:
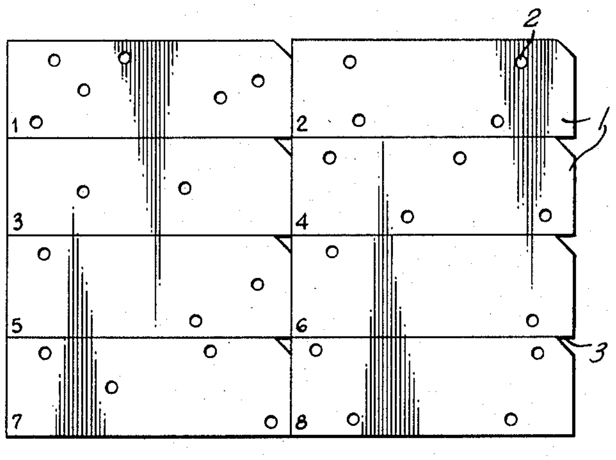
FIGURE 1 shows a two-dimensional array of integrated termcards.

Numerals 1 in FIGURE 1 denote the termcards. Each of these cards or matrix unit elements has a total of 500 spaces in which holes can be made, so that it has a capacity of 500 items of information, each hole having its predetermined position in the matrix.

FIGURE 1 shows how a number of these termcards all dedicated to the same term can be put together edge-to-edge into a larger termcard dedicated to the same term. Numerals 2 designate data holes. The figures in the left hand corner mark the set to which the card belongs. There will be an integrated card like this for every term in the vocabulary. The cards from the various sets will always be mounted in the same position relative to cards from the other sets. Two-dimensional arrays of cards of up to 4′ x 4′ are still considered quite practical. They will reduce the search time by a factor of about 100, from many hours to minutes.

Figure 2:
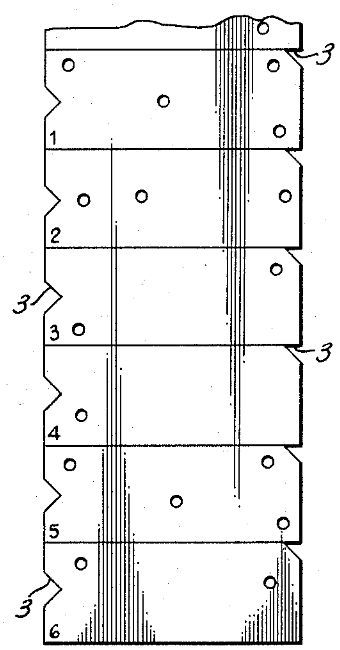
FIGURE 2 shows a one-dimensional linear array of integrated termcards.

FIGURE 2 shows termcards arranged in a linear array or term tape. In this way many more cards can be put together and each term tape can be wound on a reel. A search can be made by running tapes in superimposition under a scanner. Because of the great length these tapes may have, special "alignment" notches or holes will be required for the purpose of aligning corresponding cards accurately in superimposition when they pass under the scanner. Notches of this type are shown at the right edge of the term tape and designated by numeral 3. On the right side a different type of alignment notches are shown.

FIGURE 3 shows how cards can be fastened together in a linear array by the use of adhesive tape along the edges. FIGURE 4–A shows how the tape can be applied either doubled over along the edge as one strip along each edge, or (FIGURE 4–B) as two separate strips along each edge.

FIGURES 5 and 6 shows how cards can also be fastened together into a linear array by adhesive tape applied to the adjoining edges.

FIGURE 8 shows how a two-dimensional array of cards can be integrated by means of a combination of both methods.

If the cards are made of a fusable material the edges can be fused together, for example, by the application of a solvent, or by the application of heat as shown in FIGURE 7. There the cards 1 are butted against each other and pressed by a pressure piece 8 under spring pressure against a heating element 6.

FIGURE 9 shows an example of an apparatus for the application of adhesive tape to a linear array. The cards are fed from a hopper mechanism 10, well known in the art, on an endless belt 10, where a roll of adhesive tape unrolls on top of the cards 1. A roll of adhesive tape 13 unrolls on the bottom of the cards 1. Numeral 14 designates a pressure roller.

FIGURE 10 illustrates a read-grid by means of which the read out can be performed. It is a transparent overlay that can be placed on top of a number of superimposed integrated termcards. The serial number of each dedicated position is clearly shown in print.

The invention is not limited to the embodiments shown or described but encompasses all of the embodiments and variations contained within the scope of the claims.

I claim:

1. A data retrieval system based on the superposition of at least two physical records having encoded therein by geometrically differentiated selectively light-transmitting regions the identifications of particular documents to be retrieved from a collection, said system including:

(a) a plurality of physical records all in the form of flat, superposable arrays of unit matrix elements;

(b) each unit matrix element being a physical element having a pattern of selectively light-transmitting regions whose positions, relative to the edges of said element, designate the identities of particular documents, amongst a limited group of the documents in the collection, which have a characteristic peculiar to that unit matrix element; and (c) each of said physical records constituting the edge-to-edge assembled and secured plurality of those unit matrix elements which deal with the same peculiar characteristic of all of the documents in said collection.

2. A data retrieval system in accordance with claim 1, in which said unit matrix elements are punched cards.

3. A data retrieval system in accordance with claim 1, in which said unit matrix elements are punched cards of identical size and shape.

4. A data retrieval system in accordance with claim 1, including adhesive strips mutually securing together the adjacent edges of said unit matrix elements.

5. A data retrieval system in accordance with claim 1, and physical registering formations formed in corresponding positions on said physical records.

6. A data retrieval system in accordance with claim 1, in which said physical records are constituted by rectangular arrays of the unit matrix elements.

7. A data retrieval system in accordance with claim 1, in which said physical records are constituted by strips carrying a single column or row of said unit matrix record elements.

8. A data retrieval system in accordance with claim 2, in which said physical records are formed by the fusing together of adjacent edges of said unit matrix elements.

9. A data retrieval system in accordance with claim 2, in which said physical records are formed by the edge-to-edge adhesive of adjacent unit matrix elements.

References Cited in the file of this patent

UNITED STATES PATENTS

| | | |
|---|---|---|
| 1,165,465 | Taylor | Dec. 28, 1915 |
| 1,338,018 | Hyland | Apr. 27, 1920 |
| 2,160,665 | Linderman | May 30, 1939 |
| 2,338,058 | Read | Dec. 13, 1943 |
| 2,684,613 | Vogt | July 27, 1954 |
| 2,722,369 | Reuther | Nov. 1, 1955 |
| 2,854,898 | Vogt | Oct. 7, 1958 |
| 2,986,077 | Gelpke | May 30, 1961 |
| 3,020,800 | Perry | Feb. 13, 1962 |